(12) United States Patent
Hamann et al.

(10) Patent No.: US 8,927,644 B2
(45) Date of Patent: Jan. 6, 2015

(54) HIGH STYRENE HIGH VINYL STYRENE-BUTADIENE RUBBER WITH NARROW MOLECULAR WEIGHT DISTRIBUTION AND METHODS FOR PREPARATION THEREOF

(75) Inventors: Evemarie Hamann, Halle (DE); Silvia Valenti, Halle (DE); Gabriele Holtz, Schkopau (DE)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 14/119,961

(22) PCT Filed: Jun. 22, 2012

(86) PCT No.: PCT/EP2012/062095
§ 371 (c)(1),
(2), (4) Date: Nov. 25, 2013

(87) PCT Pub. No.: WO2012/175678
PCT Pub. Date: Dec. 27, 2012

(65) Prior Publication Data
US 2014/0107286 A1    Apr. 17, 2014

(30) Foreign Application Priority Data

Jun. 22, 2011 (EP) .................................... 11170968

(51) Int. Cl.
*C08L 9/06* (2006.01)
*C08F 212/08* (2006.01)
*C08F 4/48* (2006.01)
*C08F 236/10* (2006.01)
*C08F 4/46* (2006.01)

(52) U.S. Cl.
CPC ................. *C08F 4/48* (2013.01); *C08F 236/10* (2013.01); *C08L 9/06* (2013.01); *C08F 212/08* (2013.01); *C08F 4/463* (2013.01)
USPC ........... 524/575; 524/571; 526/174; 526/181; 526/204; 526/340

(58) Field of Classification Search
USPC ........... 524/575, 571; 526/174, 181, 204, 340
See application file for complete search history.

(56) References Cited

U.S. PATENT DOCUMENTS

| | | | |
|---|---|---|---|
| 3,496,154 A * | 2/1970 | Wofford | 526/174 |
| 5,008,343 A * | 4/1991 | Hellermann et al. | 525/316 |
| 5,698,646 A | 12/1997 | Kitamura et al. | |
| 5,916,962 A | 6/1999 | Shibata et al. | |
| 6,521,712 B1 | 2/2003 | Knoll et al. | |

FOREIGN PATENT DOCUMENTS

| | | |
|---|---|---|
| EP | 0 798 339 | 10/1997 |
| EP | 1 462 459 A1 * | 9/2004 |

OTHER PUBLICATIONS

PCT/EP2012/062095 International Search Report dated Sep. 5, 2012 (4 pages).

* cited by examiner

*Primary Examiner* — Fred M Teskin
(74) *Attorney, Agent, or Firm* — Brinks Gilson & Lione

(57) ABSTRACT

A polymer having at least the following characteristics: (a) a block styrene content with more than 4 consecutive styrene units from about 40 to about 70 weight percent based on total styrene content in the polymer; (b) a vinyl content from about 25 to about 80 weight percent based on total amount of polymerized 1,3-diene; (c) a styrene content from about 20 to about 75 weight percent based on total weight of polymer; and (d) a molecular weight distribution (Mw/Mn) of 1.5 or less.

13 Claims, No Drawings

HIGH STYRENE HIGH VINYL STYRENE-BUTADIENE RUBBER WITH NARROW MOLECULAR WEIGHT DISTRIBUTION AND METHODS FOR PREPARATION THEREOF

This application claims priority to International Application No. PCT/EP2012/062095 filed Jun. 22, 2012; and to European Application No. 11170968.9 filed Jun. 22, 2011, the entire contents of each are incorporated herein by reference.

TECHNICAL FIELD

The present teachings relate generally to high styrene high vinyl solution-based styrene-butadiene rubber (SSBR)—particularly to high styrene high vinyl SSBR with a narrow molecular weight distribution—and to methods for the preparation thereof.

BACKGROUND

High styrene and high vinyl SSBR is difficult to produce due to the kinetics of copolymerization. Typically, polar agents known as randomizers are added to the polymerization system in order to achieve random styrene incorporation.

The use of certain randomizers can result in high vinyl SSBR having a low block styrene content (>6 successive units of styrene) below 10%. Long block styrene can worsen hysteresis as reported, for example, by S. Futamura and G. Day who observed a worsening by about 18% of the tan delta at 60° C. when increasing block styrene content from 2 to about 7% (*Kautschuk Gummi Kunststoffe*, 1987, 40, No. 1, 39-43) in a carbon black-filled compound. By contrast, incorporation of small styrene blocks can result in improved abrasion and tensile strengths, particularly in silica compounds, as reported by I. Hattori et al. (143rd *Meeting of the Rubber Division of the ACS*, Spring 1993, paper 22).

Potassium 3,7-dimethyl-3-octylate is described in U.S. Pat. No. 6,521,712 for the preparation of random low vinyl soft blocks in block copolymers. Likewise, U.S. Pat. No. 6,197,889 describes the use of potassium 3,7-dimethyl-3-octylate as randomizer. In both patents, the molecular weight of the resulting polymer is very low (range 3000-200,000 g/mol).

In U.S. Pat. No. 3,294,768, the use of sodium and potassium alcoholates as randomizer for low vinyl SSBR is reported. In U.S. Pat. No. 3,787,377, sodium and potassium tert-amylate and mentholate are described in the context of continuous anionic polymerization, at a temperature from 110 to 125° C. U.S. Pat. No. 5,916,962 describes a conjugated rubber composition, which shows a broad molecular weight distribution of 1.7 or more after coupling with silicon tetrachloride.

In certain applications, it would be desirable to achieve a high styrene high vinyl SSBR having a defined incorporation of styrene as blocks of more than 4 consecutive styrene units with a narrow molecular weight distribution.

SUMMARY

The scope of the present invention is defined solely by the appended claims, and is not affected to any degree by the statements within this summary.

By way of introduction, a polymer embodying features of the present teachings has at least the following characteristics: (a) a block styrene content containing more than 4 consecutive styrene units from about 40 to about 70 weight percent based on total styrene content in the polymer; (b) a vinyl content from about 25 to about 80 weight percent based on total amount of polymerized 1,3-butadiene; (c) a styrene content from about 20 to about 75 weight percent based on total weight of polymer; and (d) a molecular weight distribution D (Mw/Mn) of 1.5 or less.

A process for polymerization of a polymer comprising monomeric units derived from a styrene monomer and a 1,3-butadiene monomer that embodies features of the present teachings includes polymerizing the monomeric units in the presence of an initiator, a potassium alcoholate and a polar agent. The polar agent comprises a structure I:

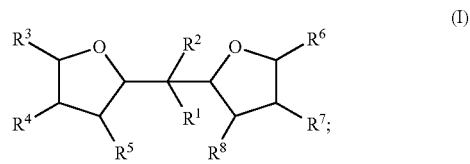

wherein $R^1$ and $R^2$ are each independently an alkyl group; wherein $R^3$, $R^4$, $R^5$, $R^6$, $R^7$ and $R^8$ are each independently selected from the group consisting of an alkyl group and hydrogen.

DETAILED DESCRIPTION

The present inventors have discovered—surprisingly and unexpectedly—a high styrene, high vinyl SSBR with a narrow molecular weight distribution, an incorporation of styrene in blocks of more than 4 consecutive styrene units ranging from about 40 to about 70%, and further features as described below.

Moreover, the present inventors have further discovered—surprisingly and unexpectedly—that it is possible to prepare the above-described high styrene high vinyl SSBR using an initiator (e.g., butyl lithium) and a randomizer (e.g., ditetrahydrofurylpropane, also known as 2,2-di(2-oxolanyl)propane or DOP) in combination with a potassium alcoholate, in some embodiments, under the following conditions: styrene content ≥20 wt %; molar ratio of potassium alcoholate/active initiator ≥0.05; and polymerization temperature ≤80° C.

Throughout this description and in the appended claims, the following definitions are to be understood:

The term "polymer" refers broadly to a material prepared via the polymerization of monomeric units. As used herein, the term "polymer" subsumes the terms "homopolymer" (polymeric material prepared from a single type of monomer), "copolymer" (polymeric material prepared from two different types of monomers), and "interpolymer" (polymeric material prepared from more than two different types of monomers).

The phrase "alkyl group" refers to a substituted or unsubstituted, straight, branched or cyclic hydrocarbon chain containing, preferably, from 1 to 20 carbon atoms. Representative examples of unsubstituted alkyl groups for use in accordance with the present teachings include but are not limited to methyl, ethyl, propyl, iso-propyl, cyclopropyl, butyl, iso-butyl, tert-butyl, sec-butyl, cyclobutyl, and the like.

The term "process" used in reference to polymerization reactions includes batch, semi-batch, and/or continuous processes.

The phrase "batch-" or "semi-batch" used in reference to a polymerization refers to a polymerization in which more than 60% of the solvent is charged in the reactor together with additional polymerization ingredients before start of the polymerization by charge of the initiator. The monomer can be charged at once before the addition of initiator, partially before the addition of initiator, partially after the addition of initiator or at once continuously after addition of the initiator over a certain time period.

The phrase "continuous polymerization" refers to a polymerization process in which the solvent, monomer(s), and any additional polymerization ingredients are fed in a continuous matter to a reactor in specified volumetric ratios. In some embodiments, two or more polymerization reactors connected in series are used. In some embodiments, reagents are fed to only one reactor.

The phrase "vinyl content" refers to a mass (or weight) percentage of butadiene incorporated in the 1,2 position in the polymer chain, and is based on the butadiene portion (total amount of polymerized butadiene) in the polymer.

The phrase "styrene content" refers to a mass (or weight) percentage of styrene in the polymer, and is based on the total weight of the polymer.

The phrase "block styrene content" refers to a weight fraction of styrene incorporated as consecutive sequences of styrene units based on the total amount of polymerized styrene in the polymer.

The term "composition" refers to a mixture of materials including a polymer material and, optionally, reaction products and/or decomposition products formed from the polymer material.

The term "active initiator" (nBL,pm) refers to the molar amount of initiator (e.g., an organolithium) that takes part in a polymerization reaction and that is not deactivated by impurities contained in the reaction medium. The term "excess initiator" (nBL,exc) refers to the molar amount of initiator that is charged to deactivate the impurities in the system.

The phrase "total amount of monomer feed" refers to the total amount of styrene and butadiene, in g/min, fed in a continuous polymerization reactor and, typically, in the first continuous polymerization reactor.

The phrase "total monomer conversion" refers to the final monomer conversion (e.g., the final sum conversion of styrene and butadiene) determined for the last polymerization reactor and/or at the end of the polymerization reaction.

By way of general introduction, a polymer in accordance with the present teachings has at least the following characteristics; (a) a block styrene content containing more than 4 consecutive styrene units from about 40 to about 70 weight percent based on total styrene content in the polymer; (b) a vinyl content from about 25 to about 80 weight percent based on total amount of polymerized 1,3-butadiene; (c) a styrene content from about 20 to about 75 weight percent based on total weight of polymer; and (d) a molecular weight distribution of 1.5 or less.

In some embodiments, a polymer in accordance with the present teachings has a block styrene content with more than 6 consecutive styrene units of between about 5 and about 30 weight percent based on total styrene content in the polymer.

In some embodiments, a polymer in accordance with the present teachings has an overall styrene content of between about 25 and about 65 weight percent, and in some embodiments between about 50 and 60 weight percent.

In some embodiments, the polymer is produced in a batch process, and in some embodiments, it is produced continuously. Presently preferred, however, is a batch process. The polymer in accordance with the present teachings has a molecular weight distribution (Mw/Mn) of 1.5 or less, such as from about 1.05 to about 1.4. In some embodiments, the molecular weight distribution is from about 1.1 to about 1.4. In some embodiments, the molecular weight distribution is from about 1.2 to about 1.35.

In some embodiments, a polymer in accordance with the present teachings has a number-average molecular weight greater than or equal to about 200,000 g/mole. In some embodiments, the number-average molecular weight is greater than or equal to about 400,000 g/mole. In some embodiments, the number-average molecular weight is greater than or equal to about 550,000 g/mole.

In some embodiments, a polymer in accordance with the present teachings has a weight-average molecular weight greater than or equal to about 250,000 g/mole. In some embodiments, the weight-average molecular weight is greater than or equal to about 500,000 g/mole. In some embodiments, the weight-average molecular weight is greater than or equal to about 600,000 g/mole.

All embodiments described above are to be understood as being disclosed in any combination, including combinations of presently preferred embodiments.

By way of further general introduction, a process for polymerization of a polymer comprising monomeric units derived from a styrene monomer and a 1,3-butadiene monomer in accordance with the present teachings includes polymerizing the monomeric units in the presence of an initiator, a potassium alcoholate and a polar agent, wherein the polar agent comprises a structure I:

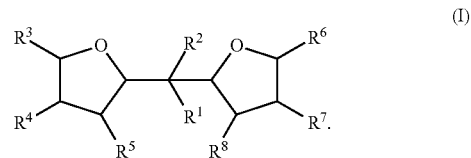

In some embodiments, $R^1$ and $R^2$ are each independently an alkyl group. In some embodiments, $R^1$ and $R^2$ are each independently a $C_1$-$C_4$ alkyl group. In some embodiments, $R^1$ and $R^2$ are each methyl.

In some embodiments, $R^3$, $R^4$, $R^5$, $R^6$, $R^7$ and $R^8$ are each independently selected from the group consisting of an alkyl group and hydrogen. In some embodiments, $R^3$, $R^4$, $R^5$, $R^6$, $R^7$ and $R^8$ are each independently selected from the group consisting of hydrogen and a $C_1$-$C_4$ alkyl group. In some embodiments, $R^3$, $R^4$, $R^5$, $R^6$, $R^7$ and $R^8$ are each independently selected from the group consisting of hydrogen and methyl. In some embodiments, $R^3$, $R^4$, $R^5$, $R^6$, $R^7$ and $R^8$ are each hydrogen.

In some embodiments, a molar ratio of the polar agent to active initiator is greater than about 0.1. In some embodiments, a molar ratio of the polar agent to active initiator is between about 0.2 and about 3.

In some embodiments, the styrene content of a monomer mixture added in the polymerization is greater than about 40 weight percent based on total weight of added monomers.

In some embodiments, a polymerization in accordance with the present teachings is run at a temperature of less than about 80° C. In some embodiments, a polymerization in accordance with the present teachings is run at a temperature of between about 10° C. and about 80° C.

Initiators that are presently preferred for use in accordance with the present teachings include those suitable for anionic polymerizations. In some embodiments, an initiator for use in accordance with the present teachings is an organolithium (e.g., alkyl lithium). Representative alkyl lithium agents for use in accordance with the present teachings include but are not limited to n-butyl lithium, sec-butyl lithium, tert-butyl lithium, n-pentyl lithium, and the like, and combinations thereof. In some embodiments, the initiator comprises n-butyl lithium.

In some embodiments, total monomer conversion is greater than about 96 weight percent based on total amount of monomer feed. In some embodiments, total monomer conversion is greater than about 98 weight percent. In some embodiments, total monomer conversion is greater than about 99 weight percent.

In some embodiments, a polymer in accordance with the present teachings has a vinyl content from about 25 to about 80 weight percent based on total amount of polymerized 1,3-butadiene. In some embodiments, the vinyl content is from about 40 to about 75 weight percent.

In some embodiments of a process in accordance with the present teachings, the potassium alcoholate comprises potassium-3,7-dimethyl-3-octylate.

In some embodiments of a process in accordance with the present teachings, the molar ratio of the polar agent to the potassium alcoholate is from about 30:1 to about 1:5.

The process in accordance with the present teachings enables the preparation of the polymer as described herein.

It is presently preferred that polymerizations in accordance with the present teachings take place in solvents, with hydrocarbon solvents being presently preferred. In some embodiments, the polymerization solvent comprises an alkane. In some embodiments, the polymerization solvent comprises cyclohexane. In some embodiments, the polymerization solvent comprises a mixture of cyclohexane with one or more additional alkanes.

By way of further general introduction, a polymer in accordance with the present teachings is formed by a process of a type described herein.

In some embodiments, a living polymer in accordance with the present teachings can be chemically modified by chain-end modification and/or coupling reactions. The appropriate chain-end modifiers and/or coupling agents can be chosen according to the target application and filler. Representative coupling agents include but are not limited to tin tetrachloride, silicon tetrachloride, divinylbenzene, alkoxysilanes, and the like, and combinations thereof.

Representative modifying agents include but are not limited to amines, amides, thioglycols, silicon alkoxides, silane-sulfide modifiers, sulfenyl halides as described in European Patent Document No. EP1016674, benzophenone, isocyanate, hydroxyl mercaptans as described in European Patent Document No. EP0464478, acrylamide compounds as described in European Patent Document No. EP0334042, and the like, and combinations thereof. Additional modifiers include but are not limited to amines, amides, imides, and nitriles modifiers as described in European Patent Document Nos. EP548799, EP510410, EP451604, and EP180141, and in U.S. Pat. No. 4,412,041. In some embodiments, silanes including but not limited to epoxy-containing silanes are used for modifying the polymer chain end for use in silica fillers as described, for example, in European Patent Document Nos. EP-A-299074, EP-A-102045, EP0447066, and EP0692493. Additional representative modifiers and/or patent references referring to such are provided in International Patent Document No. WO 2009/134665.

By way of further general introduction, a composition embodying features of the present teachings includes a polymer of a type described herein. In some embodiments, a composition in accordance with the present teachings further includes additives, such as an oil. In some embodiments, a composition in accordance with the present teachings further includes an oil in an amount from about 5 to about 40 weight percent based on weight of the polymer. In some embodiments, a composition in accordance with the present teachings does not include an oil.

In some embodiments, a composition in accordance with the present teachings includes a polymer of a type described herein and at least one additive. In some embodiments, the polymer is combined and/or reacted with one or more fillers, a vulcanization agent, and/or optionally one or more additional additives including but not limited to accelerators, coupling agents, unmodified, uncrosslinked elastomeric polymers (i.e., conventional uncrosslinked elastomeric polymers that have not been reacted with a modifier, but that have been prepared and terminated), and the like, and combinations thereof.

In some embodiments, a composition in accordance with the present teachings includes one or more fillers, which serve as reinforcement agents. Representative examples of suitable fillers include but are not limited to carbon black, silica, carbon-silica dual-phase filler, clay, calcium carbonate, magnesium carbonate, and the like, and combinations thereof. In some embodiments, a combination of carbon black and silica, carbon-silica dual-phase-fillers or a combination of carbon-silica dual-phase-filler and carbon black and/or silica are used.

In some embodiments, carbon black is manufactured by a furnace method, and has a nitrogen adsorption specific surface area from about 50 to about 200 $m^2/g$, and a DBP oil absorption from about 80 to about 200 ml/100 grams (e.g., FEF, HAF, ISAF or SAF class carbon black). In some embodiments, a "high agglomeration type" carbon black is used. In some embodiments, carbon black or silica is added in an amount from about 2 to about 100 parts by weight for 100 parts by weight of total polymer. In some embodiments, carbon black or silica is added in an amount from about 5 to about 100 parts by weight. In some embodiments, carbon black or silica is added in an amount from about 10 to about 100 parts by weight. In some embodiments, carbon black or silica is added in an amount from about 10 to 95 parts by weight.

Finally, by way of further general introduction, an article embodying features of the present teachings includes at least one component formed from such a composition. In some embodiments, the article is a tire. In some embodiments, the article is a shoe component, The following examples and representative procedures illustrate features in accordance with the present teachings, and are provided solely by way of illustration. They are not intended to limit the scope of the appended claims or their equivalents.

EXAMPLES

Monomer conversion was determined by measuring the solids concentration of the polymer solution at the end of the polymerization. The maximum solid content is obtained at 100 wt % conversion of the charged butadiene (mBd) and styrene (mSt) for the final polymer by TSC max=(mBd+mSt)/(mBd+mSt+mpolar agent+mBL+mcyclohexane) *100%. A sample of polymer solution ranging from about 1 g to about 10 g, depending on the expected monomer conversion, was drawn from the reactor directly into a 200-mL Erlenmeyer flask filled with ethanol (50 mL). The weight of the filled Erlenmeyer flask was determined before sampling ("A") and after sampling ("B"). The precipitated polymer was removed from the ethanol by filtration on a weighted paper filter (Micro-glass fiber paper, 4) φ 90 mm, MUNKTELL, weight "C"), dried at 140° C., using a moisture analyzer HR73 (Mettler-Toledo) until a constant mass was achieved. The criterion 5 was used, Finally, a second drying period was performed using switch-off criteria 4 to obtain the final mass "D" of the dry sample on the paper filter. The polymer content in the sample was calculated as TSC=(D−C)/(B−A)*100%. The final monomer conversion was calculated as TSC/TSC max*100%.

Molecular weight and molecular weight distribution of the polymer were each measured using Size Exclusion Chromatography (SEC) based on polystyrene standards. Each polymer sample (9-11 mg) was dissolved in tetrahydrofuran (10 mL) to form a solution. The solution was filtered using a 0.45-µm filter. A 100-µL sample was fed into a GPC column (Hewlett Packard system 1100 with 3 PLgel 10 µm MIXED-B columns at 40° C.). Refraction Index-detection was used as the detector for analyzing the molecular weight. The molecular weight was calculated as polystyrene based on the calibration with EasiCal PS1 (Easy A and B) Polystyrene standards from Polymer Laboratories. The number-average molecular weight (Mn) figures and the weight-average molecular weight (Mw) figures are given based on the polystyrene standards. The molecular weight distribution is expressed as the dispersity D=Mw/Mn.

Vinyl and total styrene content were measured using $^1$H-NMR, following ISO 21561-2005, using a NMR spectrometer BRUKER Avance 400 MHz), and a 5-mm dual probe. $CDCl_3$/TMS was used as solvent in a weight ratio of 0.05%:99.95%. The content of block styrene having more than 6 consecutive styrene units was determined according to the method reported by Y. Tanaka et al. in *Rubber Chemistry and Technology*, 1981, 54, No. 4, 685-691 using the relative intensity of ortho Ph-proton signals resonating higher than 6.7 ppm. The content of block styrene having 4 and more consecutive styrene units was determined according to the method described in German Patent Document No. DE69712962 using the relative intensity of the ortho Ph-proton signals resonating in the range between 6.94 and 6 ppm. The content of block styrene having 4 to 6 consecutive units was calculated from the difference between both of the above-described block styrene contents.

Comparative Example 1

Use of K-3,7-dimethyl-3-octylate (KDMO or K in the following) (50% in hexanes)

5376.55 g of dried cyclohexane were charged into an air-free and nitrogen-purged, 10-liter, stainless steel reactor. 326.17 g of 1,3-Butadiene, 403.73 g of styrene, and 0.083 mmol of K-3,7-dimethyl-3-octylate (50% in heptane) were fed into the reactor (K/active butyl lithium mol/mol=0.076). The mixture was heated up to 50° C. with stirring. The impurities in the system were titrated by stepwise addition of butyllithium. Recognizing the endpoint, the polymerization was started by addition of the total amount of 1.466 mmol of n-butyl lithium (15% solution in cyclohexane) via pump within 1 minute 19 seconds. Then the polymerization started. The temperature in the reactor raised to 65 C within 30 minutes. The reaction was finished after 200 minutes by addition of methanol as stopping agent. Irganox 1520 was introduced as antioxidant.

A sample was taken by mean of a sampling tube with a stopcock and a needle for determination of the solid content. A conversion of 99.57% was measured.

The resulting polymer was analyzed by GPC: Mn=533636, Mw=674699, D=1.264. The microstructure and styrene block content was measured by 1H-NMR. The following results were obtained: styrene=55.2%, vinyl (1,2-polybutadiene, calculated on the butadiene fraction)=12.3%, block styrene having more than 4 styrene units=82%, and block styrene having more than 6 styrene units=39%.

Comparative Example 2

Use of K-3,7-dimethyl-3-octylate (50% in hexanes)

5309.09 g of dried cyclohexane were charged into an air-free and nitrogen-purged, 10-liter, stainless steel reactor. 325.38 g of 1,3-Butadiene, 398.27 g of styrene, and 0.5011 mmol of K-3,7-dimethyl-3-octylate (50% in heptane) were fed into the reactor (K/active butyl lithium mol/mol=0.38).

The mixture was heated up to 50° C. with stirring. The impurities in the system were titrated by stepwise addition of butyllithium. Recognizing the endpoint the polymerization was started by addition of the total amount of 1.236 mmol of n-butyl lithium (15% solution in cyclohexane) via pump within 1 minute 50 seconds. Then the polymerization started. The temperature in the reactor raised to 65 C within 30 minutes. The reaction was finished after 144 minutes by addition of methanol as stopping agent. Irganox 1520 was introduced as antioxidant.

A sample was taken by mean of a sampling tube with a stopcock and a needle for determination of the solid content. A conversion of 99.18% was measured.

The resulting polymer was analyzed by GPC: Mn=510436, Mw=830705, D=1.627. The microstructure and styrene block content was measured by 1H-NMR. The following results were obtained: styrene=50.3%, vinyl (1,2-polybutadiene, calculated on the butadiene fraction)=24.3%, block styrene having more than 4 styrene units=64%, and block styrene having more than 6 styrene units=20%.

Example 1

Use of K-3,7-dimethyl-3-octylate (50% in hexanes)/DOP 5302.55 g of dried cyclohexane were charged into an air-free and nitrogen-purged, 10-liter, stainless steel reactor. 324.98 g of 1,3-Butadiene, 400.62 g of styrene, 0.5051 mmol of K-3,7-dimethyl-3-octylate (50% in heptane), and 0.4807 mmol DOP were fed into the reactor (K/active butyl lithium mol/mol=0.359, DOP/active butyllithium 0.341). The mixture was heated up to 50° C. with stirring. The impurities in the system were titrated by stepwise addition of butyllithium. Recognizing the endpoint the polymerization was started by addition of the total amount of 1.4086 mmol of n-butyl lithium (15% solution in cyclohexane) via pump within 1 minute 33 seconds. Then the polymerization started, The temperature in the reactor raised to 65° C. within 30 minutes. The reaction was finished after 200 minutes by addition of methanol as stopping agent. Irganox 1520 was introduced as antioxidant. A sample was taken by means of a sampling tube with a stopcock and a needle for determination of the solid content. A conversion of 99.11% was measured. The resulting polymer was analyzed by GPC: Mn=502096, Mw=742517, D=1.479. The microstructure and styrene block content was measured by $^1$H-NMR. The following results were obtained: styrene=55.5%, vinyl (1,2-polybutadiene, calculated on the butadiene fraction)=40%, block styrene having more than 4 styrene units=70%, and block styrene having more than 6 styrene units=24%.

Example 2

Use of K-3,7-dimethyl-3-octylate (50% in hexanes)/DOP 5309.09 g of dried cyclohexane were charged into an airfree and nitrogen-purged, 10-liter, stainless steel reactor. 325.38 g of 1,3-Butadiene, 398.27 g of styrene, 0.1265 mmol of K-3,7-dimethyl-3-octylate (50% in heptane), and 0.4807 mmol DOP were fed into the reactor (K/active butyl lithium mol/mol=0.1, DOP/active butyl lithium mol/mol=0.398). The mixture was heated up to 50° C. with stirring. The impurities in the system were titrated by stepwise addition of butyllithium. Recognizing the endpoint the polymerization was started by addition of the total amount of 1.2366 mmol of n-butyl lithium (15% solution in cyclohexane) via pump within 1 minute 50 seconds. Then the polymerization started. The temperature in the reactor raised to 65° C. within 30 minutes, The reaction was finished after 120 minutes by addition of methanol as stopping agent. Irganox 1520 was introduced as antioxidant. A sample was taken by mean of a sampling tube with a stopcock and a needle for determination of the solid content. A conversion of 99.18% was measured. The resulting polymer was analyzed by GPC: Mn=606718, Mw=810367, D=1.336. The microstructure and styrene block content was measured by $^1$H-NMR. The following results were obtained: styrene=54.4%, vinyl (1,2-polybutadiene, calculated on the butadiene fraction)=37.6%, block styrene having more than 4 styrene units=70%, and block styrene having more than 6 styrene units=24%.

Example 3

Use of K-3,7-dimethyl-3-octylate (50% in hexanes)/DOP 5241.71 g of dried cyclohexane were charged into an airfree and nitrogen-purged, 10-liter, stainless steel reactor. 321.48 g of 1,3-Butadiene, 398.25 g of styrene, 0,1198 mmol of K-3,7-dimethyl-3-octylate (50% in heptane), and 1.1846 mmol DOP were fed into the reactor (K/active butyl lithium mol/mol=0087, DOP/active butyl lithium mol/mol=0.894). The mixture was heated up to 50° C. with stirring. The impurities in the system were titrated by stepwise addition of butyllithium. Recognizing the endpoint the polymerization was started by addition of the total amount of 1.3816 mmol of n-butyl lithium (15% solution in cyclohexane) via pump within 1 minute 50 seconds. Then the polymerization started. The temperature in the reactor raised to 65° C. within 30 minutes. The reaction was finished after 120 minutes by addition of methanol as stopping agent. Irganox 1520 was introduced as antioxidant. A sample was taken by mean of a sampling tube with a stopcock and a needle for determination of the solid content. A conversion of 99.58% was measured. The resulting polymer was analyzed by GPC: Mn=557928, Mw=722762, D=1.246. The microstructure and styrene block content was measured by $^1$H-NMR. The following results were obtained: styrene=54.5%, vinyl (1,2-polybutadiene, calculated on the butadiene fraction)=52%, block styrene having more than 4 styrene units=66%, and block styrene having more than 6 styrene units=20%.

Example 4

Use of K-3,7-dimethyl-3-octylate (50% in hexanes)/DOP 5344.73 g of dried cyclohexane were charged into an airfree and nitrogen-purged, 10-liter, stainless steel reactor. 327.57 g of 1,3-Butadiene, 401.18 g of styrene, 0.1222 mmol of K-3,7-dimethyl-3-octylate (50% in heptane), and 3.531 mmol DOP were fed into the reactor (K/active butyl lithium mol/mol=0.102, DOP/active butyl lithium mo/mol=2.948). The mixture was heated up to 50° C. with stirring. The impurities in the system were titrated by stepwise addition of butyllithium. Recognizing the endpoint the polymerization was started by addition of the total amount of 1.1978 mmol of n-butyl lithium (15% solution in cyclohexane) via pump within 1 minute 46 seconds. Then the polymerization started. The temperature in the reactor raised to 65° C. within 30 minutes. The reaction was finished after 200 minutes by addition of methanol as stopping agent. Irganox 1520 was introduced as antioxidant. A sample was taken by mean of a sampling tube with a stopcock and a needle for determination of the solid content. A conversion of 99.13% was measured. The resulting polymer was analyzed by GPC: Mn=659095, Mw=859095, D=1.274. The microstructure and styrene block content was measured by $^1$H-NMR. The following results were obtained: styrene=55.1%, vinyl (1,2-polybutadiene, calculated on the butadiene fraction)=63.9%, block styrene having more than 4 styrene units=66%, and block styrene having more than 6 styrene units=19%.

Example 5

Use of K-3,7-dimethyl-3-octylate (50% in hexanes)/DOP 5417 g of dried cyclohexane were charged into an airfree and nitrogen-purged, 10-liter, stainless steel reactor. 302.28 g of 1,3-Butadiene, 371 g of styrene, 0.112 mmol of K-3,7-dimethyl-3-octylate (50% in heptane), and 1.14 mmol DOP were fed into the reactor (K/active butyl lithium mol/mol=0.105, DOP/active butyl lithium mo/mol=1.067). The mixture was heated up to 70° C. with stirring. The impurities in the system were titrated by stepwise addition of butyllithium. Recognizing the endpoint the polymerization was started by addition of the total amount of 1.07 mmol of n-butyl lithium (15% solution in cyclohexane) via pump within 30 seconds. Then the polymerization started. The temperature in the reactor was kept constant at 70° C. The reaction was finished after 120 minutes by addition of methanol as stopping agent. Irganox 1520 was introduced as antioxidant. A sample was taken by mean of a sampling tube with a stopcock and a needle for determination of the solid content. A conversion of 98.88% was measured. The resulting polymer was analyzed by GPC: Mn=673082, Mw=880826, D=1.308. The microstructure and styrene block content were measured by $^1$H-NMR. The following results were obtained: styrene=55.6%, vinyl (1,2-polybutadiene, calculated on the butadiene fraction)=42.6%, block styrene having more than 4 styrene units=53%, and block styrene having more than 6 styrene units=10%.

Example 6

Use of K-3,7-dimethyl-3-octylate (50% in hexanes)/DOP 5387 g of dried cyclohexane were charged into an airfree and nitrogen-purged, 10-liter, stainless steel reactor. 400.52 g of 1,3-Butadiene, 268 g of styrene, 0.111 mmol of K-3,7-dimethyl-3-octylate (50% in heptane), and 1.117 mmol DOP were fed into the reactor (K/active butyl lithium mol/mol=0.089, DOP/active butyl lithium mo/mol=0.889). The mixture was heated up to 70° C. with stirring. The impurities in the system were titrated by stepwise addition of butyllithium. Recognizing the endpoint the polymerization was started by addition of the total amount of 1.26 mmol of n-butyl lithium (15% solution in cyclohexane) via pump within about 30 seconds. Then the polymerization started. The temperature in the reactor was kept constant at 70° C. The reaction was finished after 90 minutes by addition of methanol as stopping agent. Irganox 1520 was introduced as antioxidant. A sample was taken by mean of a sampling tube with a stopcock and a needle for determination of the solid content. A conversion of 99.95% was measured. The resulting polymer was analyzed by GPC: Mn=606718, Mw=761935, D=1.256. The microstructure and styrene block content were measured by $^1$H-NMR. The following results were obtained: styrene=40.7%, vinyl (1,2-polybutadiene, calculated on the butadiene fraction)=40%, block styrene having more than 4 styrene units=43%, and block styrene having more than 6 styrene units=7%.

Example 7

Use of K-3,7-dimethyl-3-octylate (50% in hexanes)/DOP 18787 g of dried cyclohexane were charged into an airfree and nitrogen-purged, 40-liter, stainless steel reactor. 2343 g of 1,3-Butadiene, 929.56 g of styrene, 1.693 mmol of K-3,7-dimethyl-3-octylate (50% in heptane), and 3.394 mmol DOP were fed into the reactor (K/active butyl lithium mol/mol=0.096, DOP/active butyl lithium mo/mol=0.192). The mixture was heated up to 65° C. with stirring. The impurities in the system were titrated by stepwise addition of butyllithium. Recognizing the endpoint the polymerization was started by addition of the total amount of 17.6 mmol of n-butyl lithium (15% solution in cyclohexane) via nitrogen pressure within 5 seconds. Then the polymerization started. The temperature in the reactor was kept constant at 65° C. The reaction was finished after 60 minutes by addition of methanol as stopping agent. Irganox 1520 was introduced as antioxidant. A sample was taken by mean of a sampling tube with a stopcock and a needle for determination of the solid content. A conversion of 99.67% was measured. The resulting polymer was analyzed by GPC: Mn=252670, Mw=275487, D=1.09. The microstructure and styrene block content were measured by 1H-NMR. The following results were obtained: styrene=28%, vinyl (1,2-polybutadiene, calculated on the butadiene fraction)=28.9%, block styrene having more than 4 styrene units=45%, and block styrene having more than 6 styrene units=10%.

The Examples and Comparative Examples demonstrate that the present teachings provide a styrene-butadiene copolymer with a defined target styrene content with more than 4 consecutive styrene units, in combination with a high overall styrene content, a desired vinyl content and a narrow molecular weight distribution. By using a process in accordance with the present teachings, the novel and inventive polymers as claimed herein can be polymerized using standard polymerization techniques in high yield. All properties of the polymers as disclosed herein are properties prior to any subsequent modification, such as end-capping, coupling etc. as described above. Due to the achievement of the present teachings to provide polymers with narrow molecular weight distribution, it is possible to obtain a high amount of living chain ends at the end of the polymerization, so that uniform chain end modification is made possible.

The entire contents of every one of the patent and non-patent documents cited above are hereby incorporated by reference, except that in the event of any inconsistent disclosure or definition from the present specification, the disclosure or definition herein shall be deemed to prevail.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:
1. A polymer having at least the following characteristics:
(a) a block styrene content with more than 4 consecutive styrene units from about 40 to about 70 weight percent based on total styrene content in the polymer;
(b) a vinyl content from about 25 to about 80 weight percent based on total amount of polymerized 1,3-diene;
(c) a styrene content from about 20 to about 75 weight percent based on total weight of polymer;
(d) a molecular weight distribution (Mw/Mn) of 1.5 or less; and
(e) a weight-average molecular weight (Mw) of greater than or equal to 250,000 g/mol.
2. The polymer of claim 1 having a block styrene content with more than 6 consecutive styrene units of from about 5 to about 30 weight percent based on total styrene content in the polymer.
3. The polymer of claim 1 having a styrene content of between about 25 and about 65 weight percent based on total styrene content.
4. The polymer of claim 1 wherein the 1,3-diene comprises 1,3-butadiene.
5. The polymer of claim 1 having a number-average molecular weight (Mn) greater than or equal to about 200,000 g/mole.
6. A composition comprising the polymer of claim 1 and at least one additive.
7. An article comprising at least one component formed from the composition of claim 6.
8. A process for polymerization of a polymer comprising monomeric units derived from a styrene monomer and a 1,3-diene monomer, the process comprising:
polymerizing the monomers in the presence of n butyllithium, potassium-3,7-dimethyl-3-octylate, and a polar agent;
wherein the polar agent comprises a structure I:

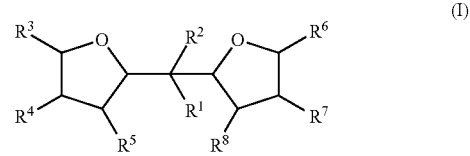

wherein $R^1$ and $R^2$ are each independently an alkyl group;
wherein $R^3$, $R^4$, $R^5$, $R^6$, $R^7$ and $R^8$ are each independently selected from the group consisting of an alkyl group and hydrogen.
9. The process of claim 8 wherein $R^1$ and $R^2$ are each independently a $C_1$-$C_4$ alkyl group, and/or $R^3$, $R^4$, $R^5$, $R^6$, $R^7$ and $R^8$ are each independently selected from the group consisting of hydrogen and a $C_1$-$C_4$ alkyl group.
10. The process of claim 8 wherein the polar agent comprises ditetrahydrofurylpropane.

11. The process of claim 8 wherein the molar ratio of the potassium-3,7-dimethyl-3-octylate to n-butyllithium is between about 0.05 and about 5.

12. The process of claim 8 wherein the polymerization is run at a temperature of about 80° C. or less, and/or the molar ratio of the polar agent to the potassium-3,7-dimethyl-3-octylate is between about 30:1 and about 1:5, and/or the molar ratio of polar agent to n-butyllithium is between about 0.1 and about 3.

13. The process of claim 8 wherein total monomer conversion is greater than about 96 weight percent based on total amount of monomer feed.

\* \* \* \* \*